United States Patent
Goetz

(10) Patent No.: US 8,015,168 B2
(45) Date of Patent: Sep. 6, 2011

(54) STRING POOLING

(75) Inventor: Oliver Goetz, Altrip (DE)

(73) Assignee: SAP AG, Walldorf (DE)

( * ) Notice: Subject to any disclaimer, the term of this patent is extended or adjusted under 35 U.S.C. 154(b) by 752 days.

(21) Appl. No.: 11/938,671

(22) Filed: Nov. 12, 2007

(65) Prior Publication Data

US 2009/0125515 A1 May 14, 2009

(51) Int. Cl.
*G06F 7/00* (2006.01)
*G06F 17/30* (2006.01)

(52) U.S. Cl. ....................................................... 707/705

(58) Field of Classification Search ........................ None
See application file for complete search history.

(56) References Cited

U.S. PATENT DOCUMENTS

| 6,434,575 | B1 * | 8/2002 | Berry et al. ............................ 1/1 |
| 6,912,516 | B1 * | 6/2005 | Ikeda et al. ...................... 706/45 |
| 7,139,894 | B1 * | 11/2006 | Mensching et al. ........... 711/170 |
| 7,302,531 | B2 * | 11/2007 | Mensching et al. ........... 711/147 |
| 7,603,719 | B2 * | 10/2009 | Thomas et al. ................. 726/29 |
| 7,765,524 | B2 * | 7/2010 | Harscoet ........................ 717/120 |
| 2007/0124362 | A1 * | 5/2007 | Kren ............................... 709/202 |

* cited by examiner

*Primary Examiner* — Kuen Lu
*Assistant Examiner* — Loan T Nguyen
(74) *Attorney, Agent, or Firm* — Mintz, Levin, Cohn, Ferris, Glovsky and Popeo, P.C.

(57) ABSTRACT

A start index and a length are obtained for a subset of a text sequence buffered within a parser. A string pool containing a plurality of pooled string objects is polled to determine whether any of the pooled string objects contain the subset of the text sequence buffered within the parser by using the start index and the length. One of the pooled string objects is used if it contains the subset of the text sequence, otherwise, the generation of a new pooled string object in the string pool containing the subset of the text sequence is initiated. Related techniques, apparatus, systems, and articles are described.

18 Claims, 9 Drawing Sheets

STRING POOLING

TECHNICAL FIELD

The subject matter described herein relates to techniques for efficiently identifying relevant pooled strings in connection with string processing tasks.

COMPUTER PROGRAM LISTING APPENDIX

A computer program listing appendix submitted to United States Patent and Trademark Office in connection with the current application, the contents of which are hereby fully incorporated by reference.

BACKGROUND

In object-oriented programming languages, including Java and C# languages, a string pool is a data structure managed internally by the platform or virtual machine to facilitate efficient implementation of certain string processing tasks. The pool contains a single copy of each distinct string that is currently represented by a string object in the system. By invoking a method of the string class (for example String.intern( ) in Java), the programmer has access to this unique string object. However, such an arrangement can result in the unnecessary creation of temporary objects as well as the unnecessary temporary allocation of memory.

SUMMARY

In one aspect, a start index and a length for a subset of a text sequence buffered within a parser is obtained. Thereafter, a string pool containing a plurality of pooled string objects is polled to determine whether any of the pooled string objects contain the subset of the text sequence buffered within the parser by using the start index and the length. One of the pooled string objects is used if it contains the subset of the text sequence, otherwise, generation of a new pooled string object in the string pool containing the subset of the text sequence is initiated.

The start index and the length can be stored in a data bucket. The data bucket can be sequentially reused for a plurality of text sequences buffered within the parser. In addition, in some implementations, the data bucket further stores a reference to the buffer of the parser.

The data stream can comprise, for example, at least one eXtensible Markup Language (XML) document. The string pool can be managed by a virtual machine.

A second start index and a second length can be obtained for a second subset of the text sequence buffered within the parser. Thereafter, the string pool containing the plurality of pooled string objects can be polled to determine whether any of the pooled string objects contain the second subset of the text sequence buffered within the parser by using the second start index and the second length. One of the pooled string objects can be used if it contains the second subset of the text sequence, otherwise, generation of a new pooled string object in the string pool containing the second subset of the text sequence is initiated.

In an interrelated aspect, a character array object is generated for a text sequence buffered within a parser. A string pool that contains a plurality of pooled string objects is then polled to determine whether any of the pooled string objects contain text contained within the character array object. One of the pooled string objects is used if it contains the text within the character array object, otherwise, generation of a new pooled string object in the string pool containing the subset of the text sequence is initiated.

In a further interrelated aspect, a start index and a length for a plurality of subsets of a text sequence buffered within a parser is obtained. Subsequently, a string pool containing a plurality of pooled string objects is polled to determine whether any of the pooled string objects contain each of the plurality of subsets of the text sequence buffered within the parser by using the corresponding start index and the length for each of the plurality of subsets of the text sequence. Thereafter, one of the pooled string objects is used if it contains one of the plurality of subsets of the text sequence, otherwise, generation of a new pooled string object in the string pool containing subsets of the text sequence is initiated if there is no matching pooled string object.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1A:
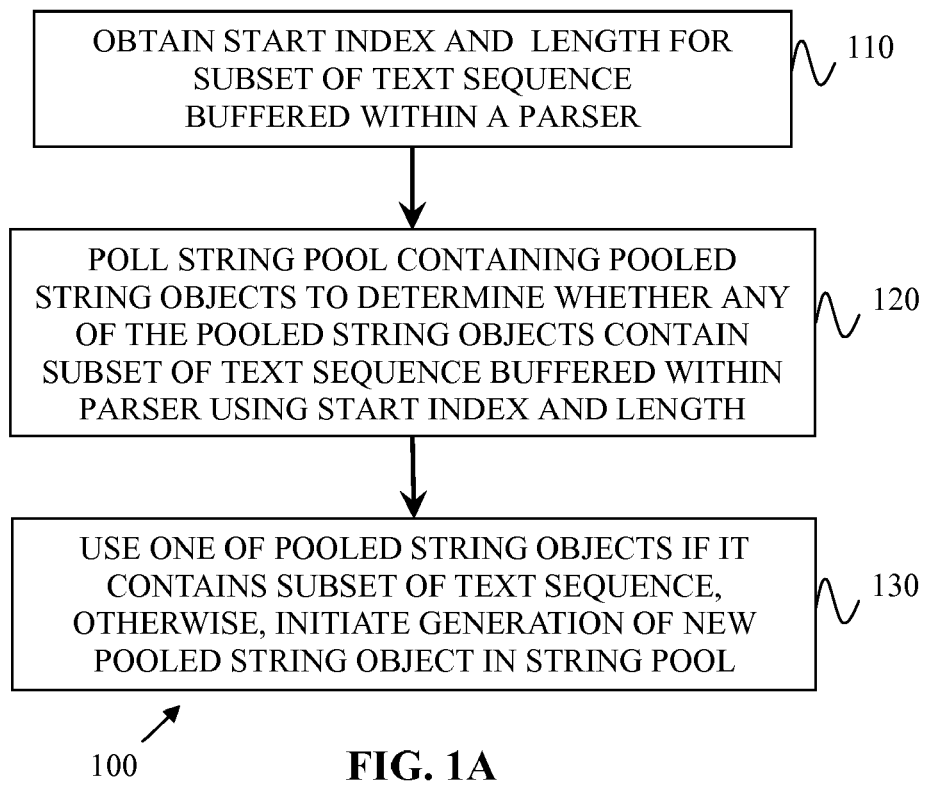
FIG. 1A is a process flow diagram illustrating a first method for identifying relevant pooled strings in connection with a string processing task.

FIG. 1A is a process flow diagram illustrating a method 100, in which, at 110, a start index and a length for a subset of a text sequence buffered within a parser is obtained. Thereafter, at 120, a string pool containing a plurality of pooled string objects to determine whether any of the pooled string objects contain the subset of the text sequence buffered within the parser by using the start index and the length is polled. One of the pooled string objects can be used, at 130, if it contains the subset of the text sequence, otherwise, generation of a new pooled string object in the string pool containing the subset of the text sequence can be initiated.

Figure 1B:
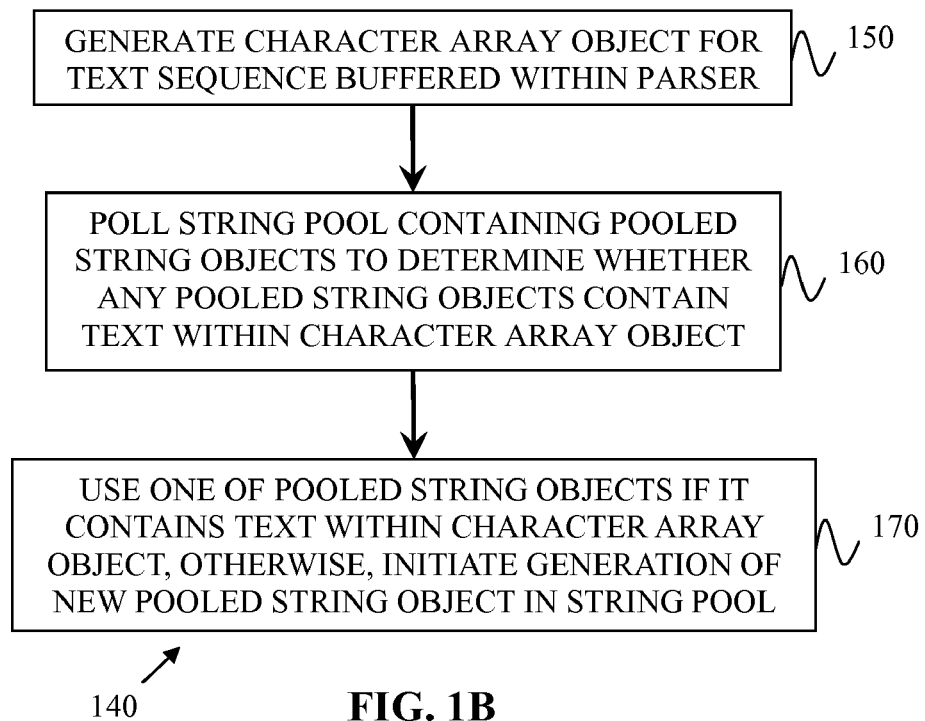
FIG. 1B is a process flow diagram illustrating a second method for identifying relevant pooled strings in connection with a string processing task.

FIG. 1B is a process flow diagram illustrating a method 140, in which, at 150, a character array object for a text sequence buffered within a parser is generated. Thereafter, at 160, a string pool containing a plurality of pooled string objects is polled to determine whether any of the pooled string objects contain text contained within the character array object. One of the pooled string objects is used, at 170, if it contains the text within the character array object, otherwise, generation of a new pooled string object in the string pool containing the subset of the text sequence is initiated.

Figure 2:
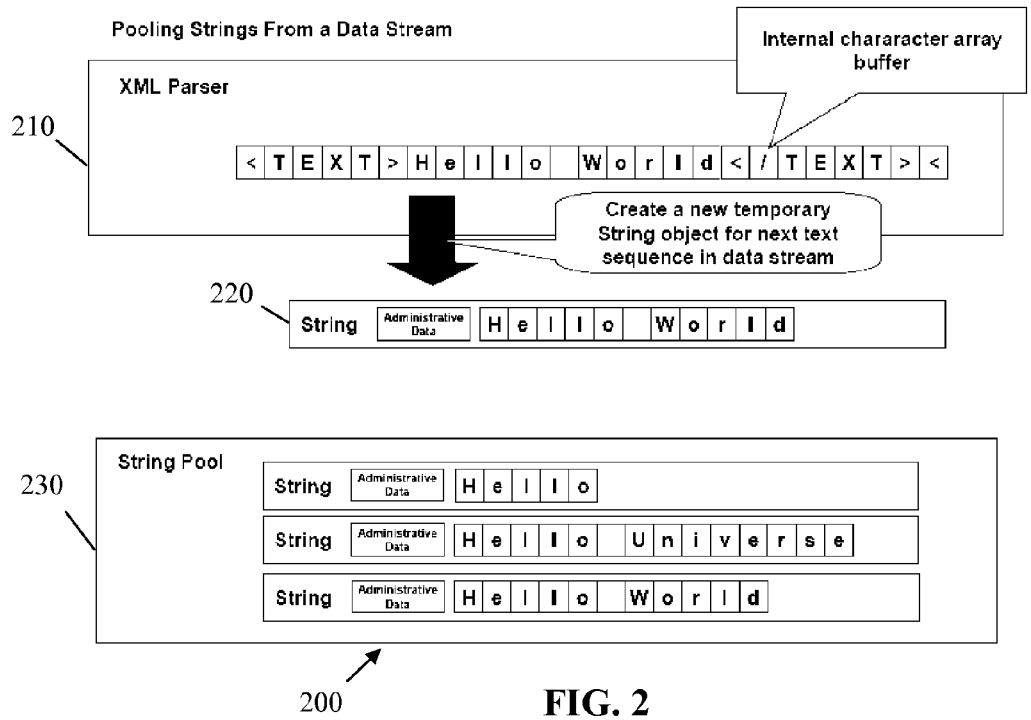
FIGS. 2-4 are diagrams illustrating a conventional arrangement in which strings are pooled from a data stream.
Figure 3:
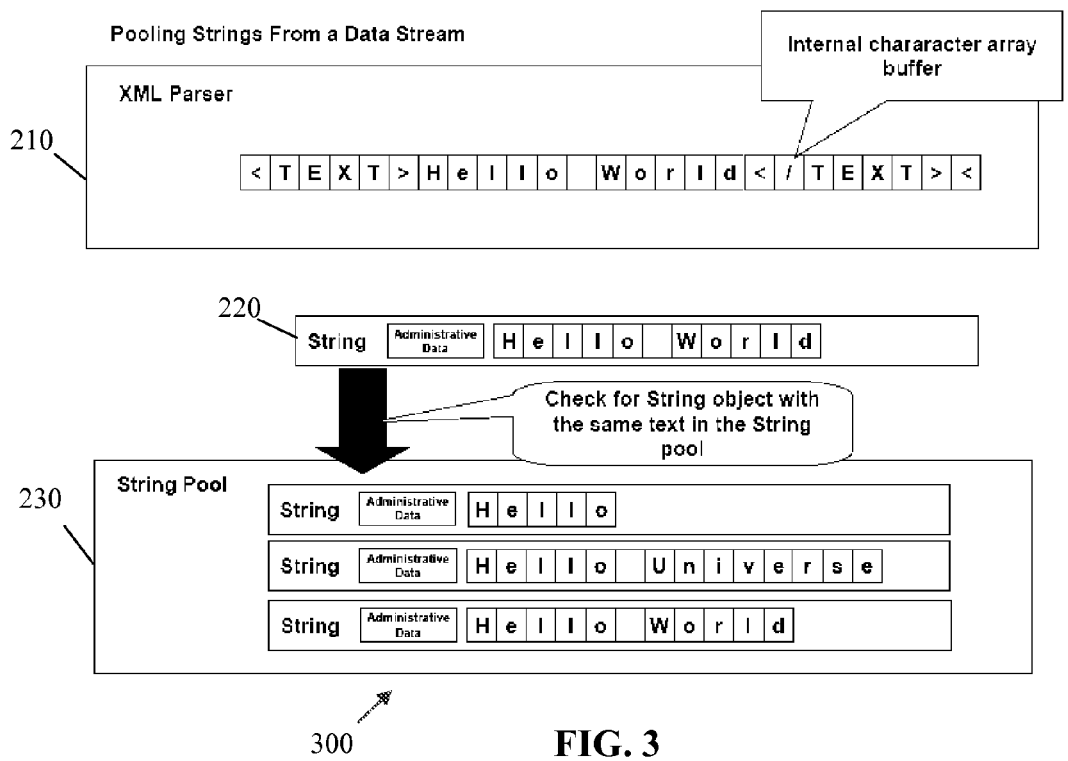
Figure 4:
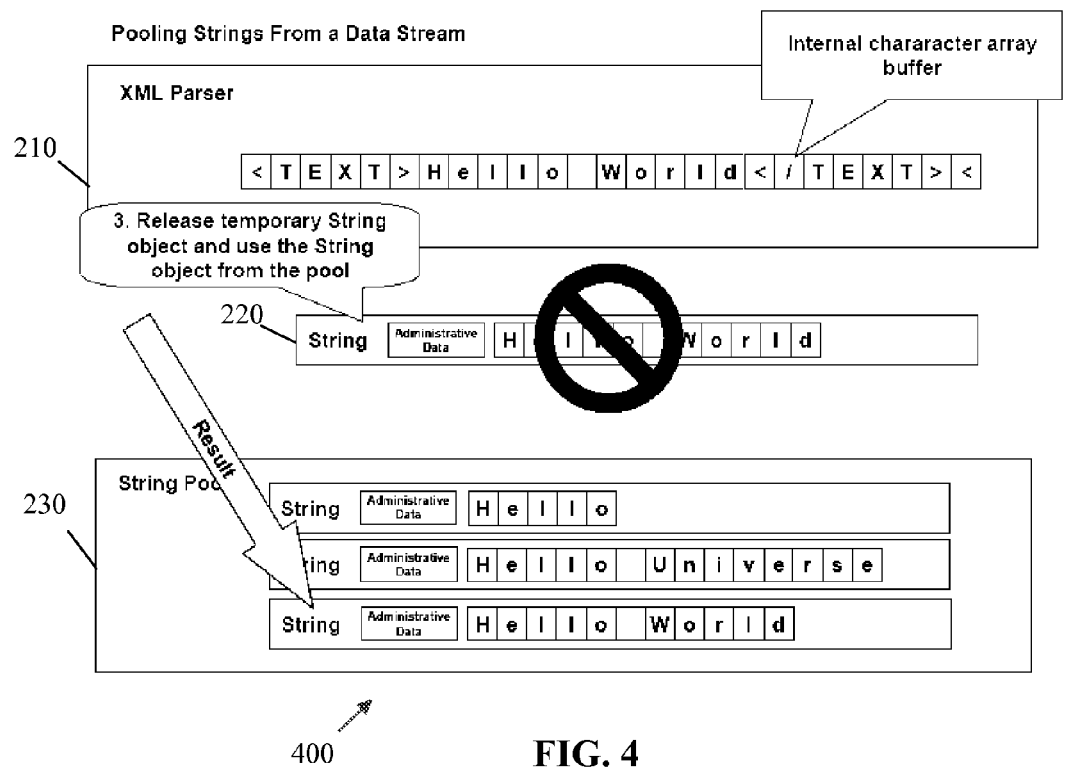

FIG. 2 is a diagram 200 illustrating a conventional arrangement in which strings are pooled from a data stream (e.g., an XML document, etc.). An XML parser 210 that stores an internal character array obtained from the data stream within a buffer causes a temporary string object 220 to be created. This temporary string object 220 is temporary and is created for the next text sequence in the data stream. The temporary string object 220 can include a character array as well as other administrative data characterizing the object. With reference to the diagram 300 of FIG. 3, a string pool 230 containing a plurality of pooled string objects is checked in order to determine whether it contains the same text as contained within string object 220. In this case (and with reference to the diagram 400 of FIG. 4), the string pool 230 contains a pooled string object with matching text and so such pooled string object is used while the temporary string object 220 is released from memory.

Figure 5:
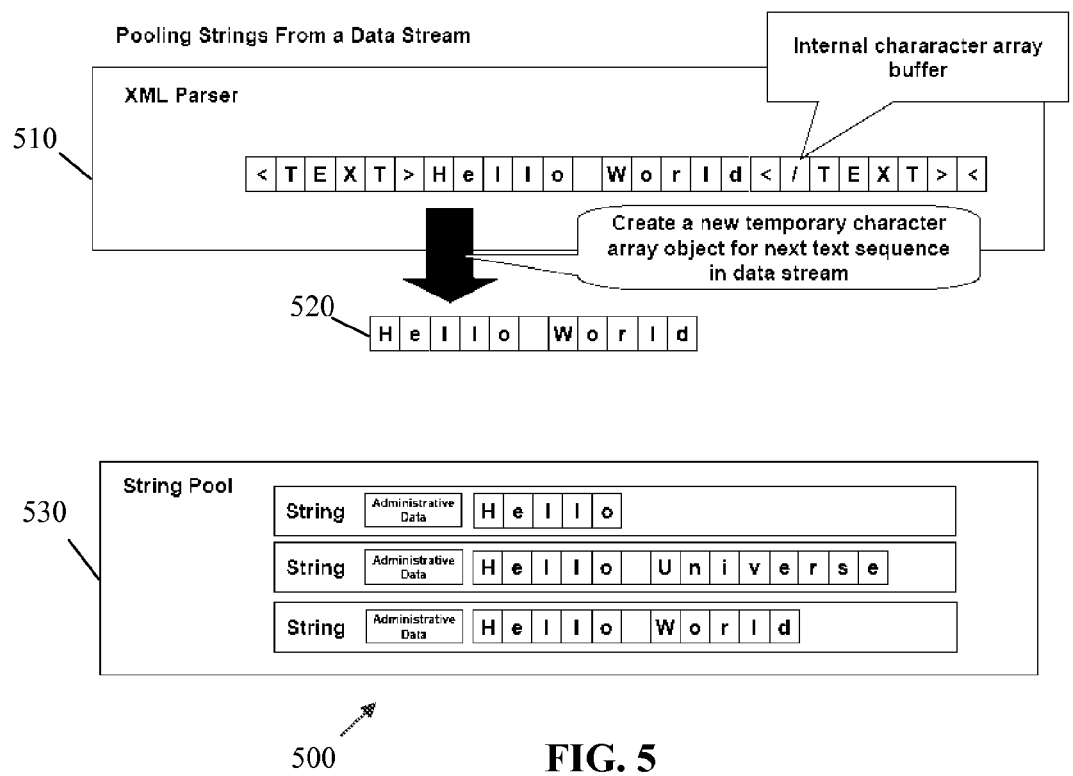
FIGS. 5-7 are diagrams illustrating an arrangement in which strings are pooled from a data stream that utilizes character array objects.
Figure 6:
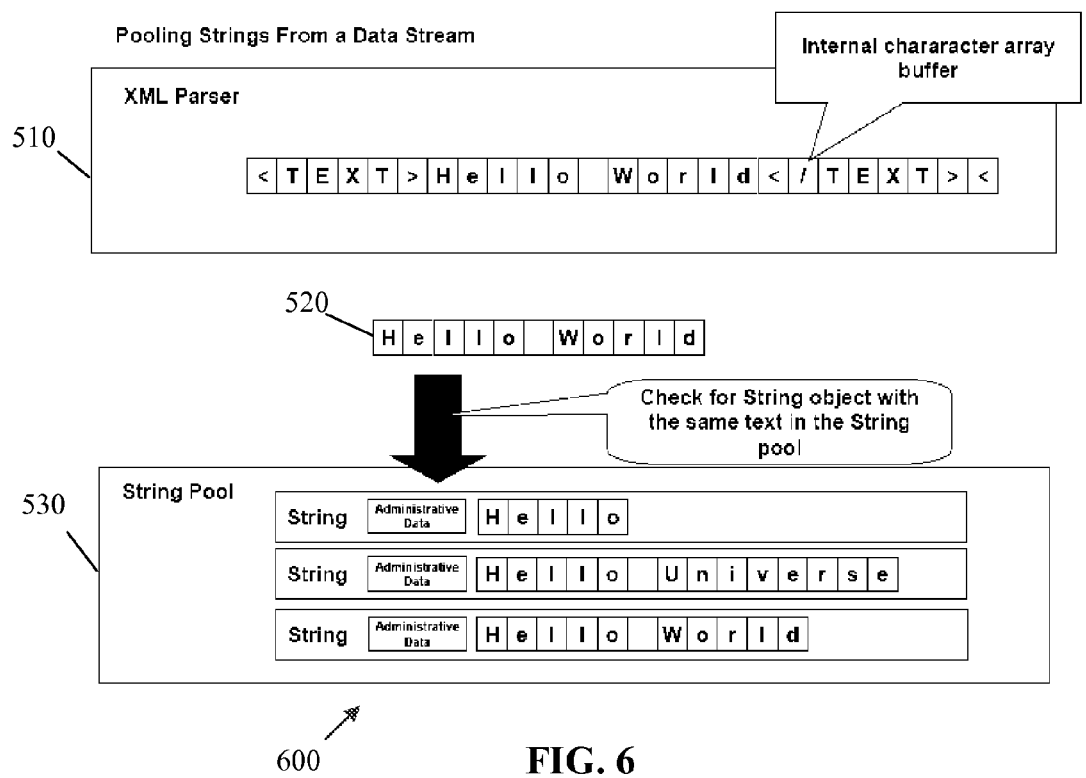
Figure 7:
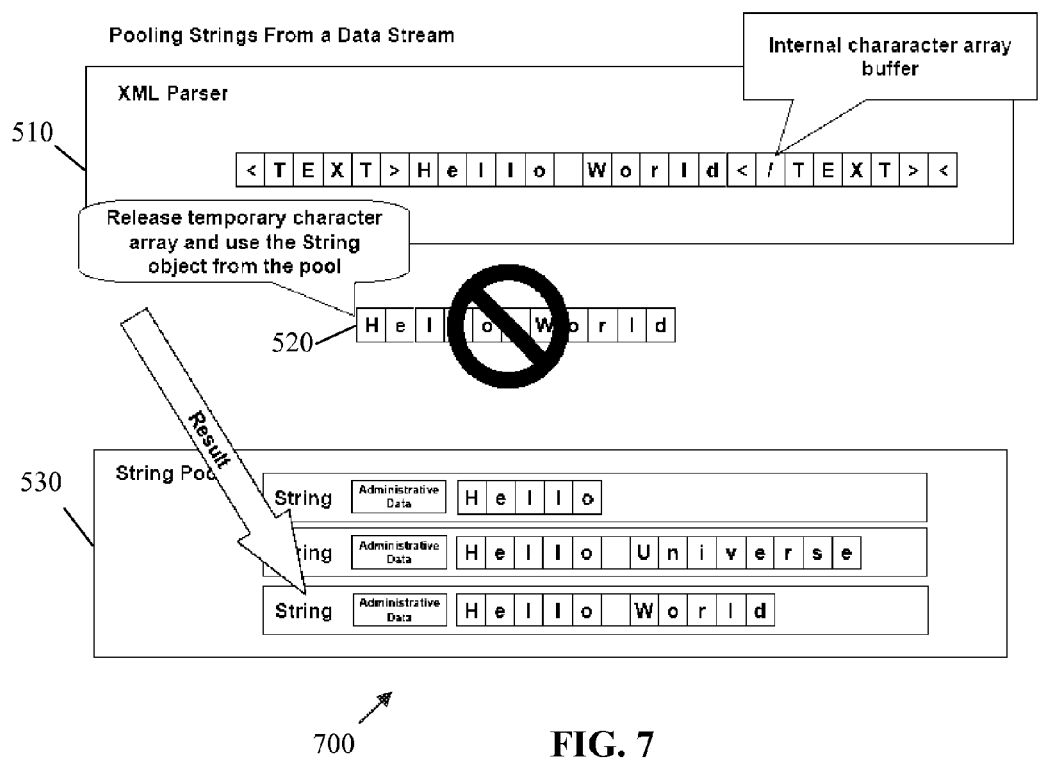

FIG. 5 is a diagram 500 illustrating an arrangement in which strings are pooled from a data stream. An XML parser 510 stores an internal character array obtained from the data stream within a buffer. Thereafter, a temporary character array object 520 is created for the next text sequence within the data stream. This temporary character array, in contrast the temporary string object 220, does not include administrative data (thereby minimizing its size). With reference to the diagram 600 of FIG. 6, a string pool 530 is checked in order to determine whether a pooled string object within the string pool 530 contains text matching the temporary character array object 520. With reference to the diagram 700 of FIG. 7, the temporary character array object 520 is released from memory and the matching pooled string object is used.

Figure 8:
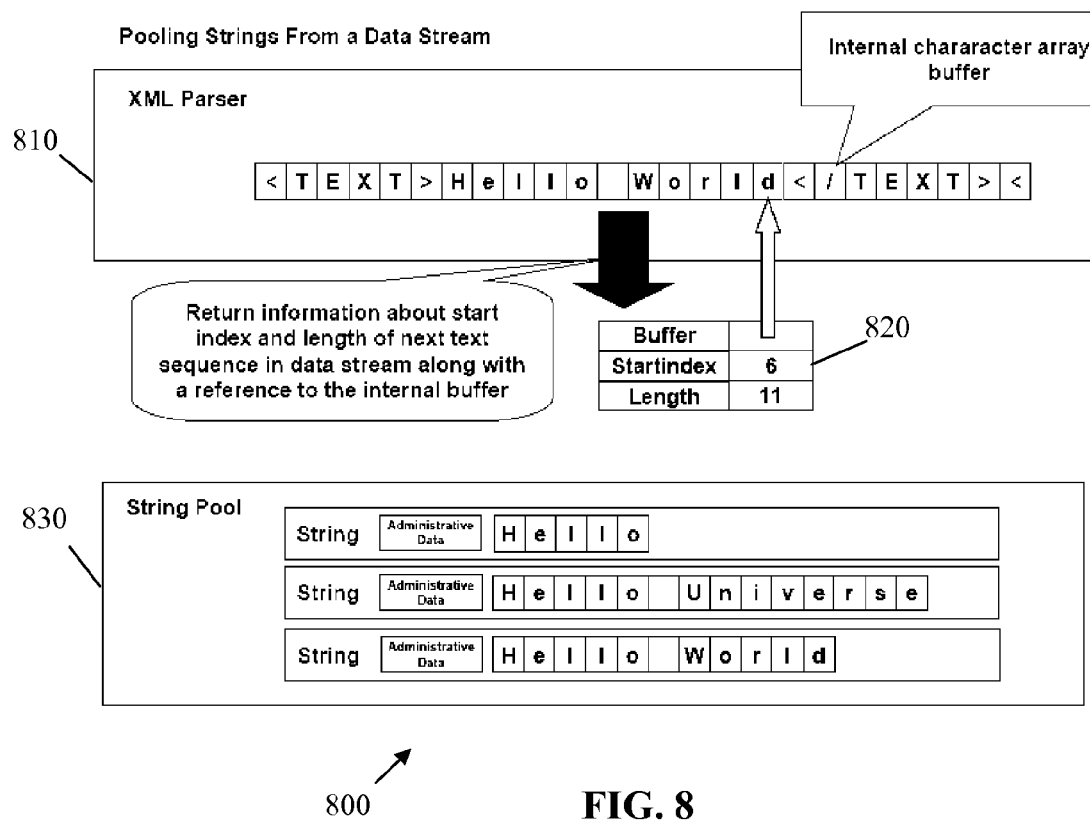
FIGS. 8-10 are diagrams illustrating an arrangement in which string objects within a pool are identified using pointer information relating to a text sequence in a data stream.
Figure 9:
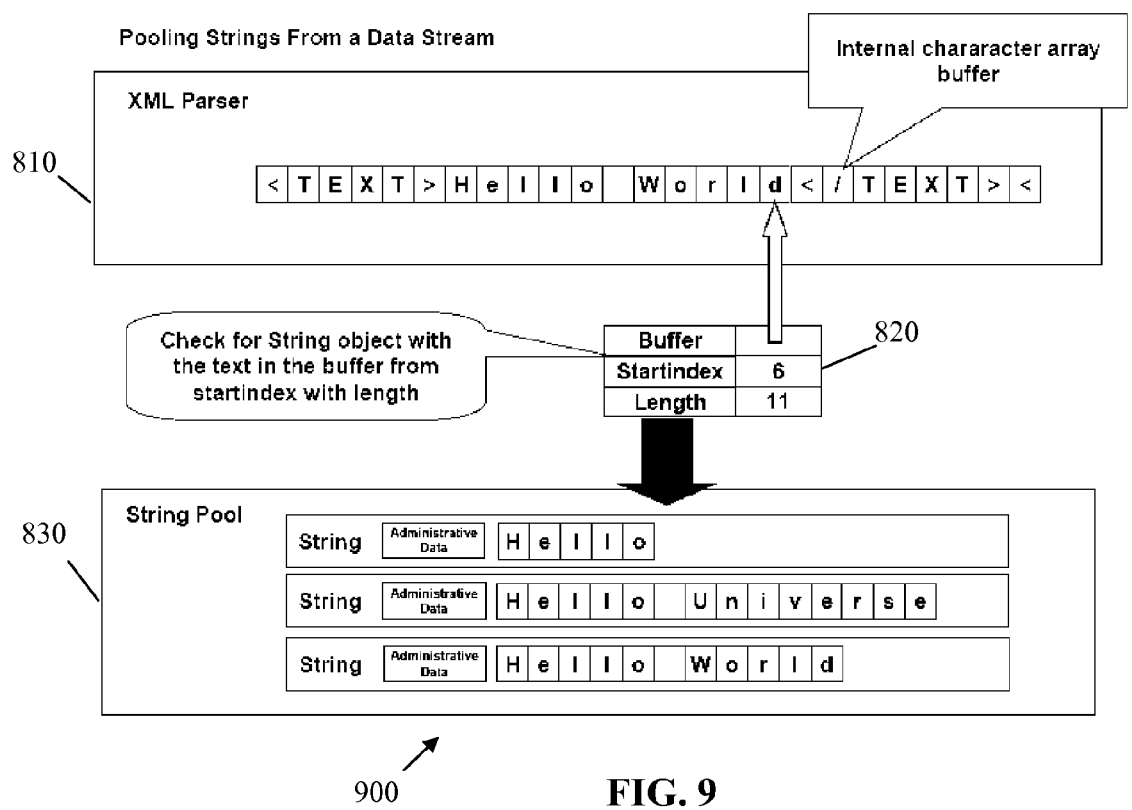
Figure 10:
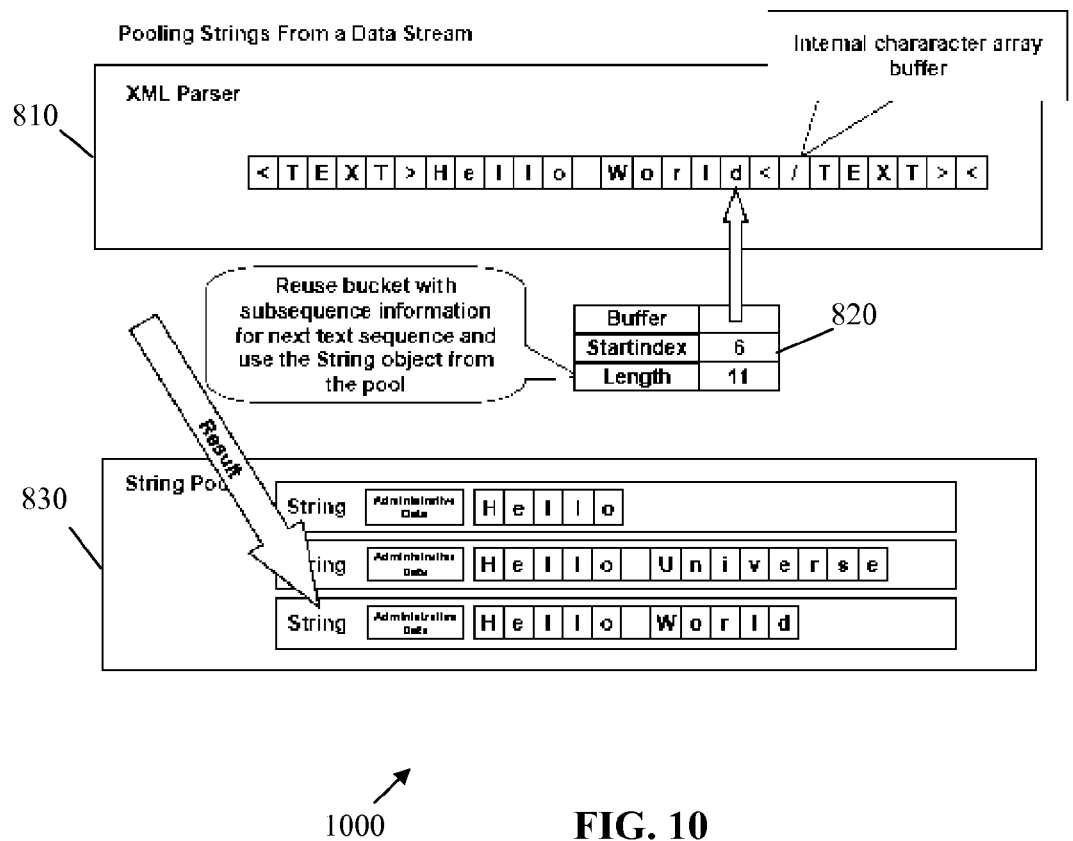

FIG. 8 is a diagram 800 illustrating a further arrangement in which strings are pooled from a data stream. In this variation, an XML parser 810 stores an internal character array obtained from the data stream within a buffer. The XML parser 810 then returns information about start index and length of the next text sequence in the data stream (which is being stored in the buffer) along with a reference to the internal buffer to a bucket 820 (e.g., a defined data structure into which data can be populated, etc.). With reference to the diagram 900 of FIG. 9, a string pool 830 is checked to see if there is a pooled string object with the text in the buffer measured from the startindex in the bucket 820 and having the length specified by the bucket 820. In this case, the startindex is equal to 6 and the length is equal to 11 and so the text "Hello World" is searched for in the string pool 830. With reference to diagram 1000 of FIG. 10, a pooled string object having text matching the text arrayed specified by the bucket 820 is used. The bucket 820 can be reused with sub-sequence (i.e., a portion of a sequence) information for the next text sequence in order to determine whether there is a pooled string object having matching text. This arrangement can be used to save processing space if the strings are parsed from a longer character sequence by avoiding the instantiation of duplicate strings and other temporary objects.

The annotated code in the computer program listing appendix is useful for understanding and implementing the current subject matter.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flows depicted in the accompanying figures and described herein do not require the particular order shown, or sequential order, to achieve desirable results. Other embodiments may be within the scope of the following claims.

Computer Program Listing Appendix

```java
package com.sap.tc.esf.util;

import java.lang.ref.ReferenceQueue;
import java.lang.ref.WeakReference;
import java.util.WeakHashMap;

/**
 * Implements a String pool
 * @author Oliver Goetz
 */
public final class StringPool {

/**
   * The pool instance
   */
  private static final StringPool theStringPool = new StringPool();
  /**
   * The map in which the strings are pooled
   */
  private static final StringPoolMap theStringPoolMap = theStringPool.new StringPoolMap();

/**
   * Returns a pooled instance of the given String. If an equal String was already in the
   * pool, the String instance from the pool is returned, otherwise the given String is
   * put into the pool and the reference to the String itself is returned.
   * @param aString a String instance
   * @return a pooled String equals to the given String
   */
  public static String poolString(String aString)
  {
    String pooledString = theStringPoolMap.get(aString);
    if (null==pooledString)
    {
      theStringPoolMap.put(aString);
      return aString;
    }
    else
      return pooledString;
  }

/**
   * Returns a pooled instance for the given character subSequence. For pooling
   * only the character subSequence from the given offset with the given length
   * in the given CharSequence is regarded. If a String representing the same
   * sequence of characters as the indicated subSequence was already in the
   * pool, the String instance from the pool is returned, otherwise a new String
   * instance is created for the subSequence and is put into the pool; the reference
   * to the newly created String is then returned.
   *
   * This method can be used to save processing space if the strings are parsed from
   * a longer character sequence by avoiding the instantiation of duplicate strings
   * in the first place.
   *
   * @param aCharSequence the character sequence from which a subSequence is to be pooled
```

```
 * @param offset the offset where the subSequence starts
 * @param length the length of the subSequence
 * @return a pooled String instance representing the indicated subSequence
 */
public static String poolString(CharSequence aCharSequence, int offset, int length)
{
  String pooledString = theStringPoolMap.get(aCharSequence, offset, length);
  if (null==pooledString)
  {
    pooledString = aCharSequence.subSequence(offset, offset+length).toString();
    theStringPoolMap.put(pooledString);
  }
  return pooledString;
}

/**
 * Returns a pooled instance for the given character array. For pooling
 * only the character subarray from the given offset with the given length
 * in the given char[] is regarded. If a String representing the same
 * sequence of characters as the indicated subarray was already in the
 * pool, the String instance from the pool is returned, otherwise a new String
 * instance is created for the subarray and is put into the pool; the reference
 * to the newly created String is then returned.
 *
 * This method can be used to save processing space if the strings are parsed from
 * a longer character array by avoiding the instantiation of duplicate strings
 * in the first place.
 *
 * @param aCharArray the character array from which a subarray is to be pooled
 * @param offset the offset where the subarray starts
 * @param length the length of the subarray
 * @return a pooled String instance representing the indicated subarray
 */
public static String poolString(char[] aCharArray, int offset, int length)
{
  String pooledString = theStringPoolMap.get(aCharArray, offset, length);
  if (null==pooledString)
  {
    pooledString = String.valueOf(aCharArray, offset, length);
    theStringPoolMap.put(pooledString);
  }
  return pooledString;
}

/**
 * This class is used for pooling String instances. In contrast to standard
 * Map implementations there are additional getter methods which allow to
 * find String instances in a pool which match given subSequences of
 * CharSequence objects or subarrays of character arrays.
 *
 * This implementation is based on the Sun JDK1.5 implementation of
 * {@link WeakHashMap}, but stripped down to the functionality necessary
 * for this String map and enhanced by the new lookup methods.
 *
 * @author Oliver Goetz
 */
private class StringPoolMap {
```

```
/**
 * The default initial capacity -- MUST be a power of two.
 */
private static final int DEFAULT_INITIAL_CAPACITY = 16;

/**
 * The maximum capacity, used if a higher value is implicitly specified by
 * either of the constructors with arguments. MUST be a power of two <= 1<<30.
 */
private static final int MAXIMUM_CAPACITY = 1 << 30;

/**
 * The load fast used when none specified in constructor.
 */
private static final float DEFAULT_LOAD_FACTOR = 0.75f;

/**
 * The table, resized as necessary. Length MUST Always be a power of two.
 */
private Entry[] table;

/**
 * The number of key-value mappings contained in this weak hash map.
 */
private int size;

/**
 * The next size value at which to resize (capacity * load factor).
 */
private int threshold;

/**
 * The load factor for the hash table.
 */
private final float loadFactor;

/**
 * Reference queue for cleared WeakEntries
 */
private final ReferenceQueue<String> queue = new ReferenceQueue<String>();

/**
 * The number of times this HashMap has been structurally modified Structural
 * modifications are those that change the number of mappings in the HashMap
 * or otherwise modify its internal structure (e.g., rehash). This field is
 * used to make iterators on Collection-views of the HashMap fail-fast. (See
 * ConcurrentModificationException).
 */
private volatile int modCount;

/**
 * Constructs a new, empty <tt>StringPoolMap</tt> with the given initial
 * capacity and the given load factor.
 *
 * @param initialCapacity
 *        The initial capacity of the <tt>StringPoolMap</tt>
```

```
 * @param loadFactor
 *     The load factor of the <tt>StringPoolMap</tt>
 * @throws IllegalArgumentException
 *     If the initial capacity is negative, or if the load factor is
 *     nonpositive.
 */
public StringPoolMap(int initialCapacity, float loadFactor) {
  if (initialCapacity < 0)
    throw new IllegalArgumentException("Illegal Initial Capacity: "
        + initialCapacity);
  if (initialCapacity > MAXIMUM_CAPACITY)
    initialCapacity = MAXIMUM_CAPACITY;

if (loadFactor <= 0 || Float.isNaN(loadFactor))
    throw new IllegalArgumentException("Illegal Load factor: " + loadFactor);
  int capacity = 1;
  while (capacity < initialCapacity)
    capacity <<= 1;
  table = new Entry[capacity];
  this.loadFactor = loadFactor;
  threshold = (int) (capacity * loadFactor);
}

/**
 * Constructs a new, empty <tt>StringPoolMap</tt> with the given initial
 * capacity and the default load factor, which is <tt>0.75</tt>.
 *
 * @param initialCapacity
 *     The initial capacity of the <tt>StringPoolMap</tt>
 * @throws IllegalArgumentException
 *     If the initial capacity is negative.
 */
public StringPoolMap(int initialCapacity) {
  this(initialCapacity, DEFAULT_LOAD_FACTOR);
}

/**
 * Constructs a new, empty <tt>StringPoolMap</tt> with the default initial
 * capacity (16) and the default load factor (0.75).
 */
public StringPoolMap() {
  this.loadFactor = DEFAULT_LOAD_FACTOR;
  threshold = (int) (DEFAULT_INITIAL_CAPACITY);
  table = new Entry[DEFAULT_INITIAL_CAPACITY];
}

// internal utilities

/**
 * Check for equality of non-null reference x and possibly-null y. By default
 * uses Object.equals.
 */
private boolean eq(Object x, Object y) {
  return x == y || x.equals(y);
}

/**
```

```
 * Check for equality of the subSequence of characters in the given
 * CharSequence from the given offset with the given length and the
 * character sequence represented by the given String instance.
 */
private boolean cq(CharSequence seq, int offset, int length, String str) {
  if ((null == seq) && (null == str))
    return true;
  if ((null == seq) || (null == str))
    return false;
  if (length != str.length())
    return false;
  for (int i = 0; i < str.length(); i++)
    if (str.charAt(i) != seq.charAt(offset + i))
      return false;
  return true;
}

/**
 * Check for equality of the subarray of characters in the given
 * char[] from the given offset with the given length and the
 * character sequence represented by the given String instance.
 */
private boolean eq(char[] seq, int offset, int length, String str) {
  if ((null == seq) && (null == str))
    return true;
  if ((null == seq) || (null == str))
    return false;
  if (length != str.length())
    return false;
  for (int i = 0; i < str.length(); i++)
    if (str.charAt(i) != seq[offset + i])
      return false;
  return true;
}

/**
 * Return index for hash code h.
 */
private int indexFor(int h, int length) {
  return h & (length - 1);
}

/**
 * Expunge stale entries from the table.
 */
private void expungeStaleEntries() {
  Entry e;
  while ((e = (Entry) queue.poll()) != null) {
    int h = e.hash;
    int i = indexFor(h, table.length);

Entry prev = table[i];
    Entry p = prev;
    while (p != null) {
      Entry next = p.next;
      if (p == e) {
        if (prev == e)
```

```
        table[i] = next;
      else
        prev.next = next;
      e.next = null; // Help GC
      size--;
      break;
    }
    prev = p;
    p = next;
  }
 }
}

/**
 * Return the table after first expunging stale entries
 */
private Entry[] getTable() {
  expungeStaleEntries();
  return table;
}

/**
 * Returns the number of key-value mappings in this map. This result is a
 * snapshot, and may not reflect unprocessed entries that will be removed
 * before next attempted access because they are no longer referenced.
 */
public int size() {
  if (size == 0)
    return 0;
  expungeStaleEntries();
  return size;
}

/**
 * Returns <tt>true</tt> if this map contains no key-value mappings. This
 * result is a snapshot, and may not reflect unprocessed entries that will be
 * removed before next attempted access because they are no longer referenced.
 */
public boolean isEmpty() {
  return size() == 0;
}

/**
 * Returns the String instance which is stored in this string pool map for
 * the given key, or <tt>null</tt> if the map contains no mapping for this key.
 *
 * @param key the key for which a pooled String is to be returned.
 * @return the pooled String instance matching the given key or
 *     <tt>null</tt> if the string pool map contains does not contain a
 *     String instance for this key.
 */
public String get(String key) {
  if (null==key)
    return null;
  int h = hash(key.hashCode());
  Entry[] tab = getTable();
  int index = indexFor(h, tab.length);
```

```
    Entry e = tab[index];
    while (e != null) {
      if (e.hash == h && eq(key, e.get()))
        return e.get();
      e = e.next;
    }
    return null;
  }

/**
   * Returns the String instance which is stored in this string pool map for
   * the given subSequence of characters, or <tt>null</tt> if the map contains
   * no mapping for this subSequence.
   *
   * @param key the character sequence
   * @param offset the offset where the subSequence starts
   * @param length the length of the subSequence
   * @return a pooled String instance representing the indicated subSequence or
   *         <tt>null</tt> if the string pool map contains does not contain a
   *         String instance for this key.
   */
  public String get(CharSequence key, int offset, int length) {
    if (null == key)
      return get(null);
    int h = hash(hashCode(key, offset, length));
    Entry[] tab = getTable();
    int index = indexFor(h, tab.length);
    Entry e = tab[index];
    while (e != null) {
      if (e.hash == h && eq(key, offset, length, e.get()))
        return e.get();
      e = e.next;
    }
    return null;
  }

/**
   * Returns the String instance which is stored in this string pool map for
   * the given subarray of characters, or <tt>null</tt> if the map contains
   * no mapping for this subarray.
   *
   * @param key the character array
   * @param offset the offset where the subarray starts
   * @param length the length of the subarray
   * @return a pooled String instance representing the indicated subarray or
   *         <tt>null</tt> if the string pool map contains does not contain a
   *         String instance for this key.
   */
  public String get(char[] key, int offset, int length) {
    if (null == key)
      return get(null);
    int h = hash(hashCode(key, offset, length));
    Entry[] tab = getTable();
    int index = indexFor(h, tab.length);
    Entry e = tab[index];
    while (e != null) {
      if (e.hash == h && eq(key, offset, length, e.get()))
```

```
    return e.get();
   e = e.next;
  }
  return null;
}

/**
 * Stores the given String instance in the string pool map. If the
 * map previously contained a mapping for this String, the old value is replaced.
 *
 * @param value
 *        the string instance to be stored in the pool map
 * @return previous string instance stored for this string, or <tt>null</tt> if
 *        there was no instance stored.
 */
public String put(String value) {
  if (null==value)
    return null;
  int h = hash(value.hashCode());
  Entry[] tab = getTable();
  int i = indexFor(h, tab.length);

for (Entry e = tab[i]; e != null; e = e.next) {
    if (h == e.hash && eq(value, e.get())) {
      return e.get();
    }
  } modCount++;
  Entry e = tab[i];
  tab[i] = new Entry(value, queue, h, e);
  if (++size >= threshold)
    resize(tab.length * 2);
  return null;
}

/**
 * Rehashes the contents of this map into a new array with a larger capacity.
 * This method is called automatically when the number of keys in this map
 * reaches its threshold.
 *
 * If current capacity is MAXIMUM_CAPACITY, this method does not resize the
 * map, but sets threshold to Integer.MAX_VALUE. This has the effect of
 * preventing future calls.
 *
 * @param newCapacity
 *        the new capacity, MUST be a power of two; must be greater than
 *        current capacity unless current capacity is MAXIMUM_CAPACITY (in
 *        which case value is irrelevant).
 */
void resize(int newCapacity) {
  Entry[] oldTable = getTable();
  int oldCapacity = oldTable.length;
  if (oldCapacity == MAXIMUM_CAPACITY) {
    threshold = Integer.MAX_VALUE;
    return;
  }
```

```
Entry[] newTable = new Entry[newCapacity];
transfer(oldTable, newTable);
table = newTable;

/*
 * If ignoring null elements and processing ref queue caused massive
 * shrinkage, then restore old table. This should be rare, but avoids
 * unbounded expansion of garbage-filled tables.
 */
if (size >= threshold / 2) {
  threshold = (int) (newCapacity * loadFactor);
} else {
  expungeStaleEntries();
  transfer(newTable, oldTable);
  table = oldTable;
  }
}

/** Transfer all entries from src to dest tables */
private void transfer(Entry[] src, Entry[] dest) {
  for (int j = 0; j < src.length; ++j) {
    Entry e = src[j];
    src[j] = null;
    while (e != null) {
      Entry next = e.next;
      Object key = e.get();
      if (key == null) {
        e.next = null; // Help GC
        size--;
      } else {
        int i = indexFor(e.hash, dest.length);
        e.next = dest[i];
        dest[i] = e;
      }
      e = next;
    }
  }
}

/**
 * Removes all mappings from this map.
 */
public void clear() {
  // clear out ref queue. We don't need to expunge entries
  // since table is getting cleared.
  while (queue.poll() != null)
    ;

modCount++;
  Entry[] tab = table;
  for (int i = 0; i < tab.length; ++i)
    tab[i] = null;
  size = 0;

// Allocation of array may have caused GC, which may have caused
  // additional entries to go stale. Removing these entries from the
```

```java
// reference queue will make them eligible for reclamation.
while (queue.poll() != null)
    ;
}

/**
 * The entries in this hash table extend StringPoolMap, using its main ref
 * field as the key.
 */
private class Entry extends WeakReference<String> {
    private final int hash;
    private Entry next;

/**
     * Create new entry.
     */
    Entry(String value, ReferenceQueue<String> queue, int hash,
        Entry next) {
        super(value, queue);
        this.hash = hash;
        this.next = next;
    } public boolean equals(Object o) {
        if (!(o instanceof Entry))
            return false;
        Entry e = (Entry) o;
        Object k1 = get();
        Object k2 = e.get();
        if (k1 == k2 || (k1 != null && k1.equals(k2))) {
            return true;
        }
        return false;
    } public int hashCode() {
        Object k = get();
        return (k == null ? 0 : k.hashCode());
    } public String toString() {
        return get();
    }
}

/**
 * Applies a supplemental hash function to a given hashCode, which defends
 * against poor quality hash functions. This is critical because HashMap uses
 * power-of-two length hash tables, that otherwise encounter collisions for
 * hashCodes that do not differ in lower bits.
 */
private int hash(int h) {
    // This function ensures that hashCodes that differ only by
    // constant multiples at each bit position have a bounded
    // number of collisions (approximately 8 at default load factor).
    h ^= (h >>> 20) ^ (h >>> 12);
    return h ^ (h >>> 7) ^ (h >>> 4);
```

}

/**
 * Calculates the hashCode for the given subSequence of characters in the
 * given CharSequence startong from offset with the given length.
 * The hashCode matches that of a String representing the same sequence
 * of characters, so it can be compared with the hashCodes stored in the
 * maps entries for the stored strings.
 * @param key the character sequence
 * @param offset the offset where the subSequence starts
 * @param length the length of the subSequence
 * @return the hashCode for the given subSequence
 * @see String#hashCode()
 */
private int hashCode(CharSequence key, int offset, int length) {
  int h = 0;
  for (int i = 0; i < length; i++) {
    h = 31 * h + key.charAt(offset++);
  }
  return h;
}

/**
 * Calculates the hashCode for the given subarray of characters in the
 * given char[] startong from offset with the given length.
 * The hashCode matches that of a String representing the same sequence
 * of characters, so it can be compared with the hashCodes stored in the
 * maps entries for the stored strings.
 * @param key the character array
 * @param offset the offset where the subSequence starts
 * @param length the length of the subSequence
 * @return the hashCode for the given subSequence
 * @see String#hashCode()
 */
private int hashCode(char[] key, int offset, int length) {
  int h = 0;
  for (int i = 0; i < length; i++) {
    h = 31 * h + key[offset++];
  }
  return h;
}

}

}

What is claimed is:

1. An article comprising non-transitory machine-readable media embodying instructions that when performed by one or more machines result in operations comprising:
    obtaining a start index and a length for a subset of a text sequence buffered within a parser;
    polling a string pool containing a plurality of pooled string objects to determine whether any of the pooled string objects contain the subset of the text sequence buffered within the parser by using the start index and the length;
    using one of the pooled string objects if it contains the subset of the text sequence, otherwise, initiating a generation of a new pooled string object in the string pool containing the subset of the text sequence;
    obtaining a second start index and a second length for a second subset of the text sequence buffered within the parser;
    polling the string pool containing the plurality of pooled string objects to determine whether any of the pooled string objects contain the second subset of the text sequence buffered within the parser by using the second start index and the second length; and
    using one of the pooled string objects if it contains the second subset of the text sequence, otherwise, initiating a generation of a new pooled string object in the string pool containing the second subset of the text sequence.

2. An article as in claim 1, wherein the start index and the length are stored in a data bucket.

3. An article as in claim 2, wherein the data bucket is sequentially reused for a plurality of text sequences buffered within the parser.

4. An article as in claim 1, wherein the data bucket further stores a reference to the buffer of the parser.

5. An article as in claim 1, wherein the data stream comprises at least one eXtensible Markup Language (XML) document.

6. An article as in claim 1, wherein the string pool is managed by a virtual machine.

7. A method comprising:
    obtaining a start index and a length for a subset of a text sequence buffered within a parser;
    polling a string pool containing a plurality of pooled string objects to determine whether any of the pooled string objects contain the subset of the text sequence buffered within the parser by using the start index and the length;
    using one of the pooled string objects if it contains the subset of the text sequence, otherwise, initiating a generation of a new pooled string object in the string pool containing the subset of the text sequence;
    obtaining a second start index and a second length for a second subset of the text sequence buffered within the parser;
    polling the string pool containing the plurality of pooled string objects to determine whether any of the pooled string objects contain the second subset of the text sequence buffered within the parser by using the second start index and the second length; and
    using one of the pooled string objects if it contains the second subset of the text sequence, otherwise, initiating a generation of a new pooled string object in the string pool containing the second subset of the text sequence.

8. A method as in claim 7, wherein the start index and the length are stored in a data bucket.

9. A method as in claim 8, wherein the data bucket is sequentially reused for a plurality of text sequences buffered within the parser.

10. A method as in claim 7, wherein the data bucket further stores a reference to the buffer of the parser.

11. A method as in claim 7, wherein the data stream comprises at least one eXtensible Markup Language (XML) document.

12. A method as in claim 7, wherein the string pool is managed by a virtual machine.

13. A computing system comprising:
    a processor;
    a memory coupled to the processor;
    wherein the memory encodes one or more programs that cause the processor to perform operations comprising:
        obtaining a start index and a length for a subset of a text sequence buffered within a parser;
        polling a string pool containing a plurality of pooled string objects to determine whether any of the pooled string objects contain the subset of the text sequence buffered within the parser by using the start index and the length;
        using one of the pooled string objects if it contains the subset of the text sequence, otherwise, initiating a generation of a new pooled string object in the string pool containing the subset of the text sequence;
        obtaining a second start index and a second length for a second subset of the text sequence buffered within the parser;
        polling the string pool containing the plurality of pooled string objects to determine whether any of the pooled string objects contain the second subset of the text sequence buffered within the parser by using the second start index and the second length; and
        using one of the pooled string objects if it contains the second subset of the text sequence, otherwise, initiating a generation of a new pooled string object in the string pool containing the second subset of the text sequence.

14. A system as in claim 13, wherein the start index and the length are stored in a data bucket.

15. A system as in claim 14, wherein the data bucket is sequentially reused for a plurality of text sequences buffered within the parser.

16. A system as in claim 13, wherein the data bucket further stores a reference to the buffer of the parser.

17. A system as in claim 13, wherein the data stream comprises at least one eXtensible Markup Language (XML) document.

18. A system as in claim 13, wherein the string pool is managed by a virtual machine.

* * * * *